March 10, 1964     C. D. STEPHENS     3,123,931
REEL AND FERRULE LOCK FOR FISHING RODS
Filed May 15, 1962
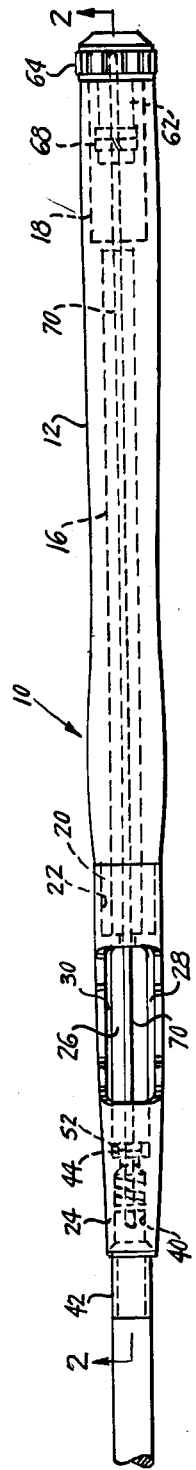
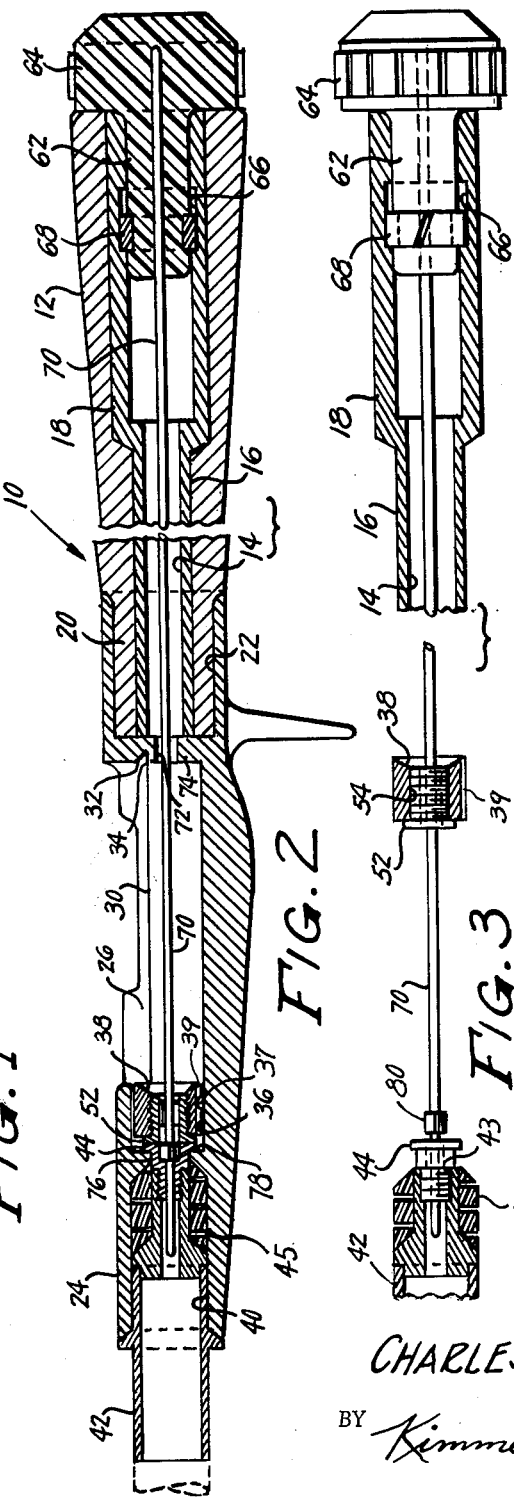
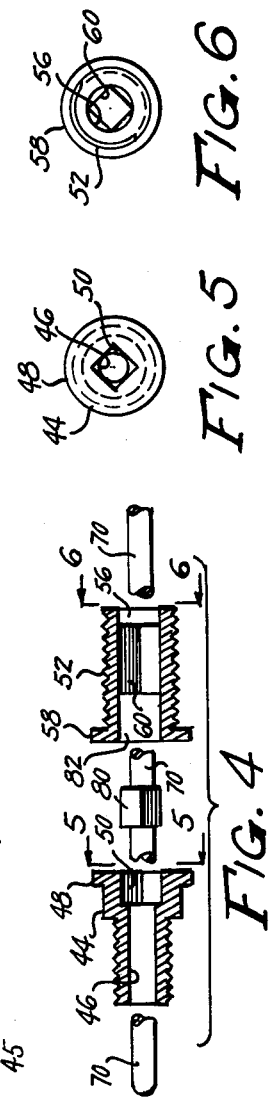
INVENTOR.
CHARLES D. STEPHENS
BY Kimmel & Crowell
ATTORNEYS.

United States Patent Office 3,123,931
Patented Mar. 10, 1964

3,123,931
REEL AND FERRULE LOCK FOR FISHING RODS
Charles D. Stephens, San Antonio, Tex., assignor to Fredric P. Schwab, San Antonio, Tex.
Filed May 15, 1962, Ser. No. 194,789
4 Claims. (Cl. 43—22)

The present invention relates to fishing rods, and more particularly to means for removably securing a reel and rod ferrule to the handle of the rod. This invention is an improved over the reel and ferrule lock shown in my U.S. Patent No. 2,793,458 issued May 28, 1957.

One of the objects of the invention is a reel and rod ferrule lock having a single operating means for slectively securing the reel and/or rod ferrule to the rod handle.

Another object of the invention is a reel and rod ferrule lock and operating means therefor having opposed locking members to secure a reel and rod ferrule to the rod handle.

Another object of the invention is a reel and rod ferrule lock having relatively few parts, which is economical to manufacture, and which is simple in operation.

Other objects and advantages of the invention will become apparent by referring to the following detailed description when taken with the accompanying drawings wherein:

FIGURE 1 is a top plan view of a fishing rod handle incorporating the novel reel and rod ferrule lock of the present invention and showing a rod ferrule secured to the handle.

FIGURE 2 is an enlarged sectional view taken on lines 2—2 of FIGURE 1 illustrating the details of the subject reel and rod ferrule lock.

FIGURE 3 is an enlarged fragmentary view of the reel and rod ferrule lock and the operating means therefor.

FIGURE 4 is an enlarged fragmentary view of the reel and rod ferrule lock elements and the key which operates the same.

FIGURE 5 is an end view of the rod furrule lock member looking in the direction of the arrows 5—5 in FIGURE 4.

FIGURE 6 is an end view of a portion of the reel lock looking in the direction of the arrows 6—6 in FIGURE 4.

Referring now to the drawing in detail, there is shown a fishing rod handle 10 having a reel and rod ferrule lock constructed in accordance with the teaching of the invention. The fishing rod handle comprises an elongated generally cylindrical member 12 having a bore 14 extending longitudinally therethrough. A sleeve 16 having an enlarged end 18 is positioned in the bore 14 and extends the length thereof. One end 20 of the cylindrical member 12 is of reduced diameter and is fixed in a socket 22 formed in the forward section 24 of handle 10. The forward section 24 includes an opening 26 in the side wall thereof for the reception of a reel foot. A pair of longitudinally extending shoulders 28 and 30 are formed interiorly of the forward section 24 and oppositely disposed adjacent the opening 26. The forward section 24 is provided with an undercut 32 which defines a shoulder 34 contiguous with shoulders 28 and 30 and which together therewith provides a support for the reel foot.

The forward section 24 of handle 10 includes a cylindrical bore 36 in which is positioned a reciprocable lock member 38. Lock member 38 is, as mentioned, reciprocable in bore 36 to engage the foot of a reel inserted in opening 26 to secure the reel to the handle. The means to reciprocate the lock member 38 will be later described. The free end of the forward section 24 is provided with a socket 40 in which a rod ferrule 42 is received and secured. The rod ferrule 42 is of the type having a threaded bore 43 therein for the reception of an externally threaded securing member 44. The ferrule 42 has mounted on the end thereof a helical compression member 45. The securing member 44 has a bore 46 extending longitudinally therethrough and a flanged portion 48 at one end thereof. A part of the bore 46 extending inwardly from the flanged end of securing member 44 is substantially square in cross section as indicated by reference number 50.

A second externally threaded member 52, similar to securing member 44, is engaged in a threaded bore 54 of lock member 38. The threaded member 52 is provided with a longitudinally extending bore 56 and a flanged portion 58 at one end thereof. A portion of the bore 56 intermediate the ends thereof is substantially square in cross section as indicated by the number 60. The diameter of the portions of bore 56 extending inwardly from opposite ends of threaded member 52 is greater than the dimension of the intermediate square portion 60 for reasons later described.

The enlarged end 18 of the sleeve 16 which is positioned in bore 14 of cylindrical member 12 receives a projecting portion 62 of rotatable operating knob 64. The enlarged portion 18 is provided with a circumferential recess 66 in which a split ring 68, fixed in a groove (not shown) in the projecting portion 62 of knob 64, is disposed, the dimension of the wall of the split ring 68 being approximately one-half the length of recess 66. The split ring 68 residing in recess 66 maintains the operating knob 64 in assembled relation to cylindrical member 12.

An operating rod 70 having one end thereof fixed in knob 64 extends through sleeve 16, through passage 72 in wall 74 of forward section 24, and through the bores 56 and 46 of threaded member 52 and securing member 44, respectively. The free end of the rod 70 extends into socket 40 at the free end of the forward section 24. Also extending into socket 40 through opening 76 in the bottom wall 78 thereof is the threaded portion of securing member 44. Spaced inwardly from the free end thereof, the rod 70 has formed thereon a square key portion 80 adapted to engage in the square portions 50 and 60 of bores 46 and 56 in securing member 44 and threaded member 52.

FIGURE 2 illustrates the reel and rod ferrule locks 38 and 44 in their respective operative positions. As shown, the securing member 44 extends through opening 76 into socket 40 with the flanged portion 48 thereof in engagement with wall 78. Reel lock 38 is positioned in bore 36 with the flanged portion 58 of the threaded member 52 in abutting engagement with the flanged portion 48 of securing member 44 and the bores 46 and 56 in alignment. The square key portion 80 on the rod 70 is positioned to engage in square portion 50 in bore 46 of securing member 44.

When the rod ferrule 42 is to be engaged in the handle 10, the same is inserted into socket 40 in forward section 24. Operating knob 64 is rotated in a clockwise direction rotating operating rod 70. The square key portion 80 thereon engaged in the square portion 50 in the bore 46 in securing member 44 causes rotation of the same and engagement of the threads thereon in a threaded bore in rod ferrule 42. When the rod ferrule 42 is tightened in socket 40 by securing member 44, compression member 45 is compressed and expands into gripping engagement with the walls of socket 40.

After the rod ferrule 42 has been secured in handle 10, a reel can be mounted thereon by inserting the reel foot into the opening 26 in forward section 24. The reel foot is supported in the opening 26 by shoulders 28, 30 and 34. Reciprocation of the reel lock member 38 in bore 36 of the forward section 24 into engagement with the reel foot is also effected by rotation of operating knob 64 and operating rod 70. Rotation of the reel lock member 38 in bore 36 is prevented by the coaction of a pin 37 extending from the wall of bore 36 and disposed in longitudinal groove 39 in the reel lock member 38. However, in order for the square key portion 80 to engage in square portion 60 in the bore 56 in threaded member 52, the operating knob 64 must be moved away from the end of cylindrical member 12. Movement of the operating knob 64 will, of course, cause movement of operating rod 70 to initially position the square key portion 80 in enlarged portion of the bore 56. The enlarged portion of bore 56 provides a neutral zone 82 wherein the square key portion 80 can be rotated, by rotating operating knob 64, into alignment with square portion 60. When the square key portion 80 on rod 70 is in alignment with the square portion 60 in bore 56, the operating knob is moved further away from the end of cylindrical member 12 causing the square key portion 80 to engage in the square portion 60 in the bore 56. The operating knob 64 is rotated in a clockwise direction causing rotation of threaded member 52 in the threaded bore 54 of lock member 38. Since the flanged portion 58 of the threaded member 52 is in abutting engagement with the flanged portion 48 of securing member 44 which is in engagement with wall 78, movement of threaded member 52 relative to lock member 38 is prevented. However, lock member 38 will be moved, relative to threaded member 52, in bore 36 and into engagement with the reel foot to secure the reel in position. The operating knob 64 is then moved toward the handle 10 and into abutting engagement with the end of cylindrical member 12. Outward movement of the operating knob 64 is limited by the engagement of split ring 68 with the wall of recess 66 in the enlarged portion 18 of sleeve 16.

It will b apparent that the rod ferrule 42 can be released from the socket 40 by rotating the operating knob 64 in a counterclockwise direction. The reel lock member 38 is moved to release the reel by moving the operating knob 64 away from the end of cylindrical member 12 to cause engagement of square key portion 80 in the square portion 60 of bore 56 in threaded member 52 and rotating the operating knob 64 in a counterclockwise direction.

While the invention has been described in its preferred embodiment, modifications will become apparent to those skilled in the art. However, such modifications are considered to be within the purview of the appended claims.

I claim:

1. A fishing rod handle having an opening therein to receive the foot of a fishing reel, a lock member reciprocable in said handle to releasably secure the fishing reel thereto, said handle further including socket means at one end thereof to receive a rod ferrule, means in said handle to releasably lock the rod ferrule in said socket means, a single rotatable operating means movable in one direction to operate said reciprocable lock member and movable in the opposite direction to operate the rod ferrule lock means selectively, said rotatable operating means comprising an elongated operating rod having key means thereon engageable with said reciprocable lock member and said ferrule lock means selectively, an operating knob rotatably mounted in said handle at the end opposite said socket, and said operating rod being fixed to said operating knob.

2. A fishing rod handle including an elongated generally cylindrical member and a forward section fixed to one end thereof, said cylindrical member including portions defining a bore therethrough, a sleeve positioned in said bore, said forward section having portions defining an opening therein for the reception of the foot of a fishing reel, shoulders adjacent said opening to support the reel foot, a reciprocable reel lock member in said forward section operable to releasably engage the reel foot, the free end of said forward section having portions defining a socket to receive a rod ferrule, a securing member extending into said socket for threaded engagement with the rod ferrule, a rotatable operating knob mounted for limited reciprocating movement in said sleeve at the free end of said cylindrical member, an operating rod fixed at one end to said operating knob and extending through said sleeve and into operative relation to said reel lock member and said ferrule securing member, key means on said operating rod engageable with said reel lock member upon reciprocation of said operating knob in one direction and engageable with said ferrule securing member upon reciprocation of said operating knob in the opposite direction.

3. A fishing rod handle as defined in claim 2 wherein said forward section includes a longitudinally extending bore adjacent the opening therein and in alignment with the socket in the free end thereof, a wall member having a centrally disposed opening therein disposed between said bore and said socket, said securing member extending into said socket being disposed in said opening, a flange on said securing member in engagement with said wall member on the bore side thereof, said reel lock member comprising a generally cylindrical body having a threaded bore therethrough and positioned in said bore in said forward section, a threaded member engaged in the bore of said cylindrical body, a flange on said threaded member in abutting engagement with the flange on said securing member, portions of said securing member defining a bore therethrough, portions of said threaded member defining a bore therethrough in alignment with the bore in said securing member, and said key means on said operating rod engageable in the bore in said securing member and the bore in said threaded member selectively upon reciprocation of said operating knob.

4. A fishing rod handle as defined in claim 3 wherein a portion of the bore in said securing member adjacent the flange thereon is square in cross-section, a portion of the bore in said threaded member spaced inwardly from the flanged end thereof being square in cross-section, said key means on said operating rod having a square configuration and engageable in the square portion of the bore in said securing member, the portion of the bore in said threaded member between the square portion thereof and the flange thereon having a diameter of greater dimension than said square portion and defining a neutral zone, said square key movable from engagement in the square portion of the bore in said securing member into said neutral zone upon initial reciprocation of said operating knob, said square key rotatable in said neutral zone upon rotation of said operating knob to align the same with the square portion of the bore in said threaded member, and said square key movable into the square portion of the bore in said threaded member upon further reciprocation of said operating knob.

References Cited in the file of this patent

UNITED STATES PATENTS

| | | |
|---|---|---|
| 2,594,536 | Beyer | Apr. 29, 1952 |
| 2,793,458 | Stephens | May 28, 1957 |